INVENTORS.
Stanley Goddard
Norman A. Smith
BY

ATTORNEY

INVENTORS.
Stanley Goddard
Norman A. Smith

BY

ATTORNEY

INVENTORS.
Stanley Goddard
Norman A. Smith

ATTORNEY

United States Patent Office 3,471,280
Patented Oct. 7, 1969

3,471,280
CYLINDER SPINNING WITH SMOOTHING
FEED MEANS
Stanley Goddard, Painted Post, and Norman A. Smith, Corning, N.Y., assignors to Corning Glass Works, Corning, N.Y., a corporation of New York
Filed Oct. 13, 1965, Ser. No. 495,394
Int. Cl. C03b 19/04, 23/08
U.S. Cl. 65—71                                    6 Claims

ABSTRACT OF THE DISCLOSURE

When centrifugally forming glass cylinders from relatively high viscosity glasses, a bead of the stream-fed glass is inherently formed which creates seed or blister is subsequently applied glass, and accordingly a roller is applied to the newly presented glass to eliminate the bead and provide a smooth surface for the subsequently applied glass.

---

This invention relates to method and apparatus for centrifugally forming glass cylinders from relatively high viscosity glasses.

In the past it has been known to centrifugally form glass cylinders from relatively low viscosity glasses, such as those glasses which are stream-fed at a viscosity below 1,000 poises. In such known processes, the low viscosity molten glass is stream-fed into one end of a rotating mold and a formed cylinder is extracted from the opposite end. Due to the fact that such glasses are very fluid, the stream-fed glass entering the mold quickly flows into the surrounding glass as the mold rotates, so that subsequently applied glass has a substantially even entrance or impingement surface. Such smooth flowing delivery, as is accomplished with the low viscosity glasses, permits the stream feeding of such glass to the rotating mold without entrapping air, which forms blisters or seed in the final product.

However, when attempting to centrifugally form glass cylinders from molten glass having a viscosity in the upper end of the low viscosity range, and particularly glasses above 1,000 poises, the higher viscosity glass entering the mold does not dissipate or flow into the surrounding glass, but rather forms an annular bead or ridge, upon which subsequent glass is deposited. As the foot of the incoming stream lands upon the rounded surface of the bead formed by the previously deposited glass stream it is unstable and has a tendency to wobble back and forth across the top of the bead, thus entrapping air and forming seed and blisters. As a result of this phenomena, the known method of forming glass cylinders from low viscosity glass is not completely satisfactory for forming glass cylinders from relatively higher viscosity glasses above 1,000 poises since the resulting high seed and blister count renders the final product useless for virtually all commercial purposes.

The present invention sets forth a novel method and apparatus which now permits the centrifugal forming of glass cylinders from relatively high viscosity glasses above 1,000 poises. In its basic concept, the instant invention not only resides in a novel method and apparatus for centrifugally forming quality glass cylinders from high viscosity glasses, but also resides in the determination and recognition of the problem which heretofore prevented the formation of such cylinders, and the solution to such problem. That is, upon determining the fact that the viscous stream-fed glass formed a ridge or bead which resulted in the entrapment of air upon the presentation of additional material forming blisters and seed in the final product, method and apparatus was devised to eliminate such problem and produce improved blister-free glass cylinders.

High viscosity glass is stream-fed into one end of a water cooled centrifugally rotating mold, and a rigidly formed glass cylinder is continuously withdrawn from the opposite end. In order to eliminate the formation of a bead or ridge inherently produced along a defined or continuous line in the loading zone by the introduction of the high viscosity glass stream, a cooled roller is positioned within the loading end of the rotating mold adjacent the impingement point of the stream so as to immediately flatten or roll-out the bead formed along such line by the stream. Accordingly, a flattened smooth surface is continuously presented to the loading stream as the mold rotates, which facilitates the production of improved blister-free glass cylinders. The roller is preferably water cooled and resiliently tensioned with a predetermined force in operative rolling engagement with the newly presented glass. In the preferred embodiment, the roller is mounted as an idler roller and is rotated by the motion of the rotating mold, however if desired, the roller may be positively driven at synchronous or variable speeds with the rotation of the rotating mold.

It thus has been an object of the invention to provide a novel method and apparatus for centrifugally forming improved glass cylinders from molten glass having a higher viscosity than heretofore utilized for such purpose.

A further object of the invention has been to provide a novel method and apparatus for centrifugally forming substantially blister and seed-free glass cylinders from molten glass having a viscosity above 1,000 poises.

An additional object of the invention has been to recognize the problem of feed-buildup or ridges produced by stream feeding high viscosity glasses into a rotating mold, and providing a novel solution to this problem by eliminating such buildup and providing a smooth surface for further stream delivery.

A still further object of the invention has been to provide improved rolling apparatus for smoothing-out high viscosity stream-fed glass immediately after its introduction into the mold, so as to provide a smoothly-rolled surface for the introduction of additional stream-fed glass thereto, thus preventing the entrapment of blister and seed.

A further object has been to provide means for holding the wall thickness of a cylinder to a close tolerance, by compensating for minor variations in glass flow rate or cylinder feed speed.

These and other objects of the invention will be more apparent to those skilled in the art from the following disclosure and accompanying drawings in which.

Figure 1:
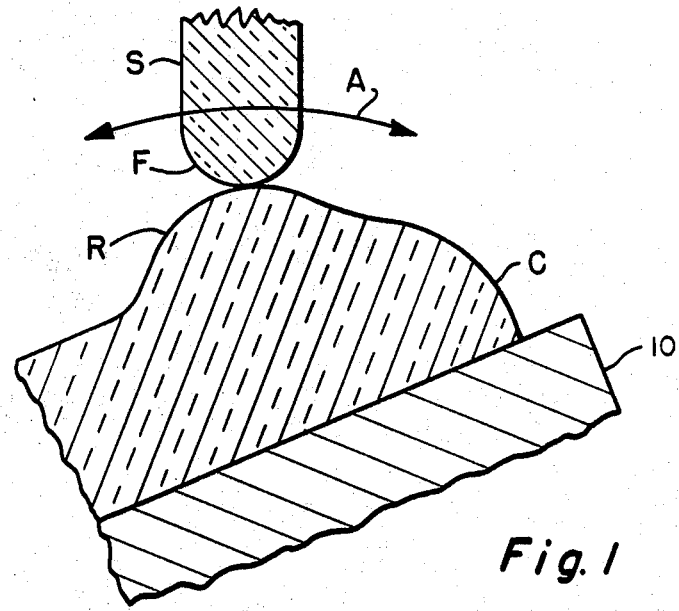
FIGURE 1 is a greatly enlarged schematic illustration showing the phenomena which occurs when high viscosity glass is stream-fed into a cylindrical rotating mold.

Referring now to the drawings, FIGURE 1 illustrates the problem encountered when loading a rotating cylindrical mold with stream-fed high viscosity glass. As shown, a bead or rim R of such high viscosity glass is formed on the glass cylinder C at the loading end of a rotating mold 10 during the feeding operation. As the incoming stream S lands upon the rim R, formed by previously deposited high viscosity glass, the uneven surface produced by the rim causes the foot F of the stream to wobble back and forth across the rounded surface of the ridge R as shown by the arrow A. When the stream wobbles back and forth over the previously formed bead or rim R, it has a tendency to either double back on itself or form a wavy track which cannot be followed exactly by a subsequently presented stream, thus entrapping blisters and seeds in the final product.

Figure 2:
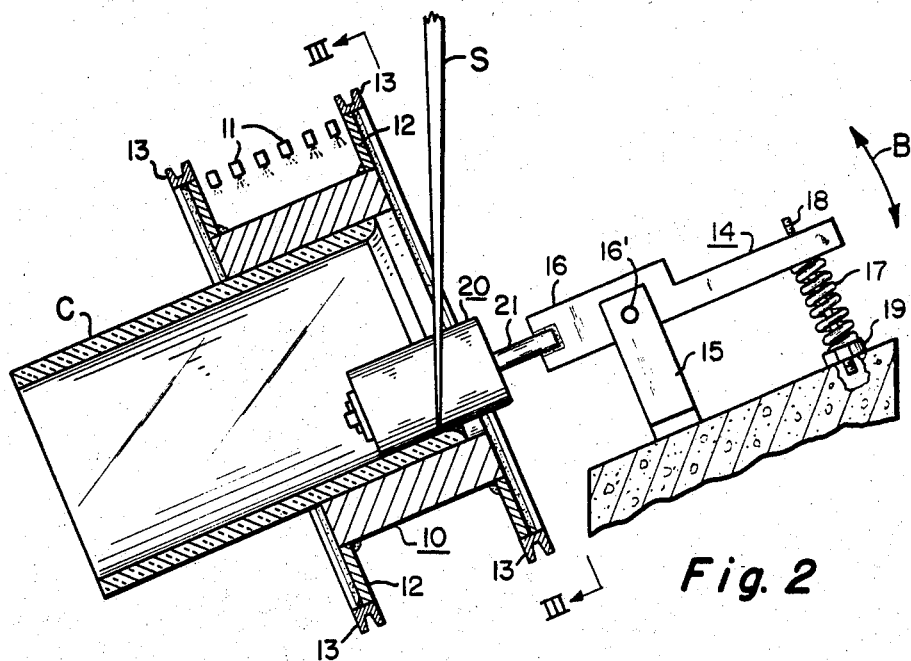
FIGURE 2 is a somewhat schematic cross-sectional view in elevation illustration a preferred embodiment of the apparatus and method of the instant invention.
Figure 3:
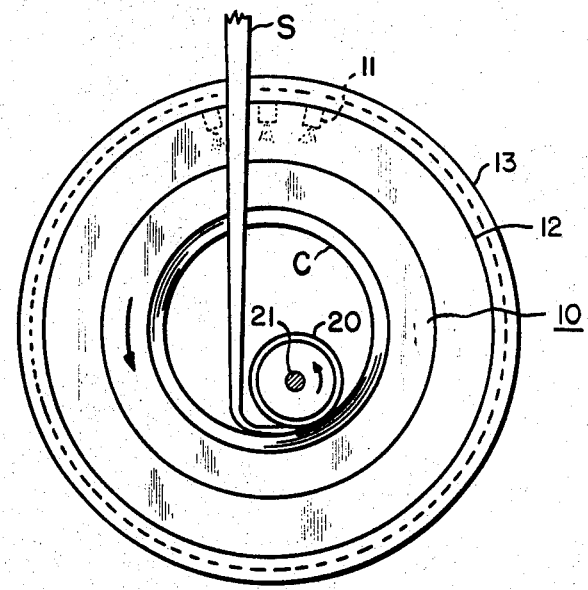
FIGURE 3 is an end elevational view of the mold and roller taken along line III—III of FIGURE 2.

Referring now to FIGURES 2 and 3, a roller assembly 20 is shown cooperating with rotating mold 10 and glass cylinder C to eliminate the bead or rim of glass inherently formed by stream feeding high viscosity glass S to a centrifugal forming mold. The mold 10, which may be made of any suitable material such as 420 stainless steel or Ampco–18 aluminum bronze, is shown provided with a plurality of air-water cooling spray nozzles 11 to maintain the mold at a desired uniform temperature along its longitudinal extent. A pair of annular water guards or splash shields 12 may be provided adjacent each end of the mold 10 to prevent any excess cooling water from contacting the newly formed glass cylinder. However, a good portion of the spray normally turns to steam on contacting the mold and is dissipated in the atmosphere.

Suitable trunnions or supports 13 are provided for centrifugally rotating the mold 10 about its longitudinal axis. Preferably the longitudinal axis of the mold, about which the mold is rotated, is positioned at an angle to the horizontal so as to facilitate reception of the vertically-downwardly stream S of molten glass fed into the loading end of the rotating mold 10.

A roller mounting assembly 14 supports the roller assembly 20 in operative position within the mold 10. The mounting assembly has a fixed bracket 15 provided with an arm 16 pivotally mounted thereto by means of pivot pin 16'. The other end of arm 16 is spring tensioned upwardly by spring 17 so as to maintain the roller assembly 20 in engagement with the cylinder C by pivotal movement about pin 16', as shown by arcuate arrow B. The degree of spring tension imparted by spring 17 may be adjusted by means of a fixed threaded stem 18 and an adjusting nut 19 threaded thereon.

Figure 4:
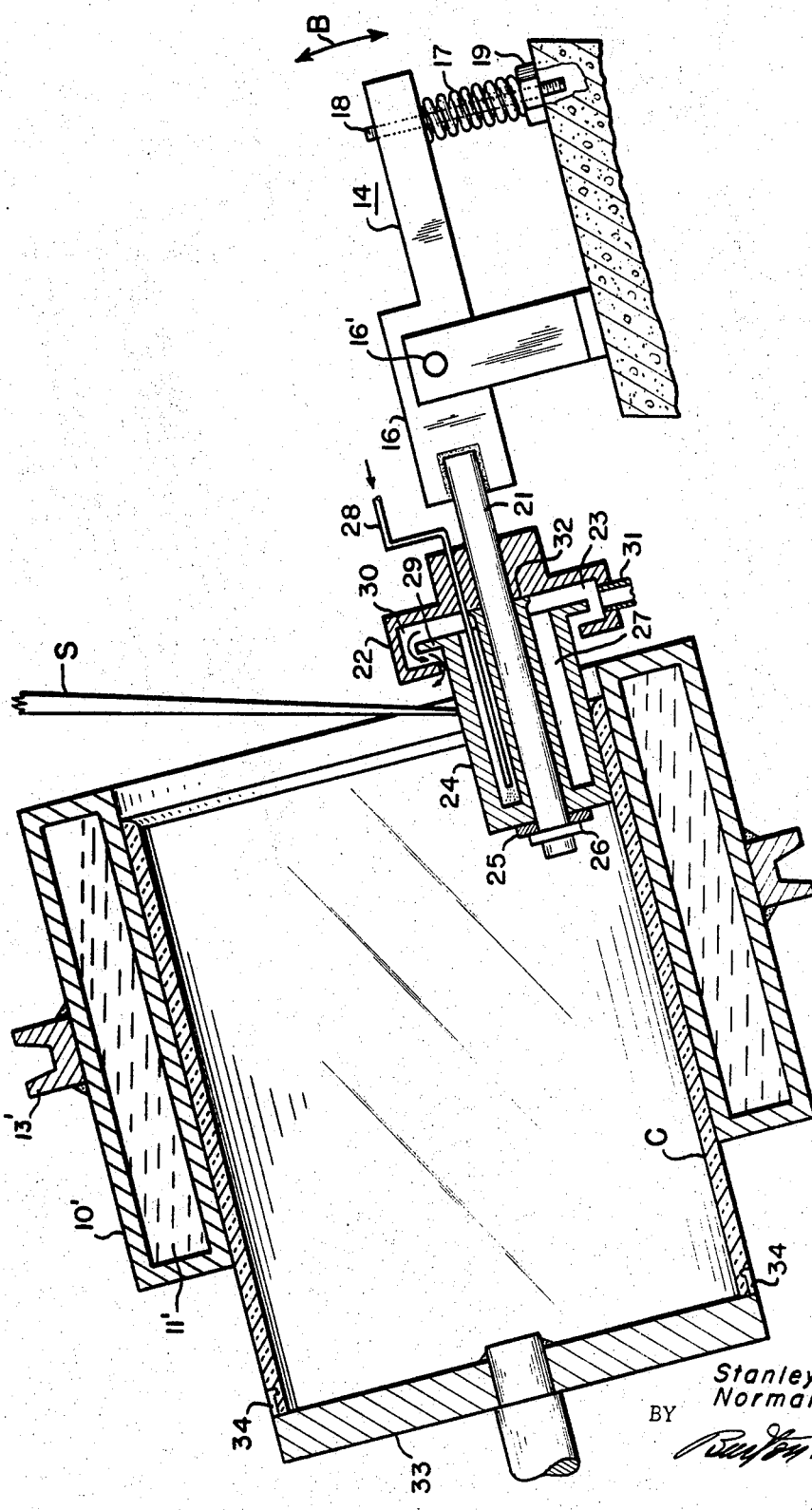
FIGURE 4 is a side elevational view in section illustrating a further embodiment of the rotating mold and the internal construction of the smoothing roller.

Referring now to FIGURE 4, the cross-sectional structure of the roller assembly 20 is illustrated in operative position within a modified cylindrical mold 10' having an integral internal cooling water chamber 11' and support trunnion 13'. A fixed roller shaft 21 is secured to and retained by the inner end of pivot arm 16. An outer casing 22, forming an annular channel 23, is rigidly secured to the shaft 21. A hollow cylindrical roller 24 is rotatably mounted on the shaft 21 by means of a washer 25 and retaining pin 26.

The hollow cylindrical roller 24 is provided with a water cooling chamber 27 which is in open communication with the annular channel 23 of outer case 22. A water inlet conduit 28 projects through the outer casing 22 and within water cooling chamber 27 so as to supply cooling fluid to the roller 24. In addition, a radial flange 29 projects from the roller 24 within channel 23 to provide a U-shaped outlet passage 30 to exhaust steam from the cooling system. A water outlet 31 is provided in the bottom of the outer casing 22 to drain the cooling water from the system. The roller 24, which may be made of any suitable material such as 304 stainless steel, is rotatably retained on the shaft 21 between the washer 25 and a bearing surface 32 of the casing 22.

A catcher or pulling ring 33 is longitudinally movable along and rotatable about the longitudinal axis of the rotating mold. The catcher ring 33 is initially positioned within the mold 10 to form a temporary bottom therefor. A pair of gripping dogs 34 engage the sidewall of the newly formed cylinder and the catcher is rotatably withdrawn along the axis of the mold to continually remove the newly formed cylinder from the mold. The cylinder wall thickness may be governed by adjusting the flow rate of molten glass to the mold and the rate at which the catcher or pulling ring removes the cylinder therefrom.

In operation, the water-cooled rotatable mold is positioned beneath the supply orifice with its longitudinal axis of rotation at an angle to the horizontal so as to facilitate the stream feeding of molten glass into the loading end of the mold. Initially, the catcher ring is positioned within the mold to form a temporary bottom therefor as the stream of molten glass is initially fed into the rotating mold. The catcher ring is then extracted from the mold pulling the newly formed cylinder therewith, and facilitating the positionment of the water-cooled roller within the loading end of the rotating mold, adjacent the impingement of the loading stream of high viscosity glass.

The roller smooths-out the rim or bead which is inherently formed upon the loading of the rotating mold by such high viscosity glass, and thereby presents a smooth surface of molten glass for the continued impingement of the glass stream as the mold continues to rotate at a desired rate of rotation. In addition, should any minor variations in glass flow rate or cylinder extraction speed occur, the roller compensates for any excess glass by rolling out the same and thus helps to maintain close tolerances in the wall thickness. The rate of rotation will, of course, vary with the diameter of the mold being utilized, and may vary from about 60 to 200 r.p.m. for a 14" diameter mold. The only critical factor which must be considered in determining the rate of rotation is that a total outward acceleration of at least one "g" is required to keep the cylinder stabilized. That is, below this acceleration (32.2 ft./sec.$^2$) the cylinder has a tendency to flop about in the mold and is not retained against the inner surface of the rotating mold.

As previously mentioned, the roller 20 may simply be a free-rolling cylindrical water-cooled roller which rotates about its longitudinal axis of symmetry when it is placed in contact with the internal surface of the cylinder C. The roller is pressed upon the glass cylinder C by means of a spring located on the opposite side of a fulcrum from the roller. The spring pushes upwardly, thus pushing the roller downwardly upon the glass, and the pressure is adjustable by means of an adjusting nut on the spring mount. A total pressure of about 1½ to 2 pounds has produced satisfactory results with a 3" long and 2¾" diameter roller operating on glass at 3,000 poises delivered at a flow rate of 750 pounds per hour.

Utilizing a 9" long stainless steel mold having a 14" inside diameter and provided with an integral water cooling jacket, improved blister-free glass cylinders were produced from high viscosity glass under the following conditions: The mold was positioned 56" beneath a molten glass orifice at an angle of 15° to the horizontal. Glass at a viscosity of 1250 poises was fed to the mold at a rate of between 670 and 750 pounds per hour forming a cylinder at a rate of 6½" per minute. A three inch long roller was positioned adjacent the impingement of the loading stream and exerted a pressure of 1½ to 2 pounds upon the loading surface of the glass cylinder to smooth-out the incoming stream.

Similarly good results were obtained when producing glass cylinders from a molten glass delivered at 3250 poises from the orifice at the flow rate of 750 pounds per hour to a mold rotating at 150 r.p.m. positioned 56" beneath the glass orifice. The water cooled mold was positioned at an angle of 15° to the horizontal, and the glass cylinder was formed at a rate of 6" per minute, with the catcher ring extracting the newly formed cylinder from the mold at such rate. The 3" roller was maintained in contact with the loading surface with a pressure of 1½ to 2 pounds, and was cooled by circulating water therethrough at a rate of approximately 125 cubic centimeters per minute.

Figure 5:
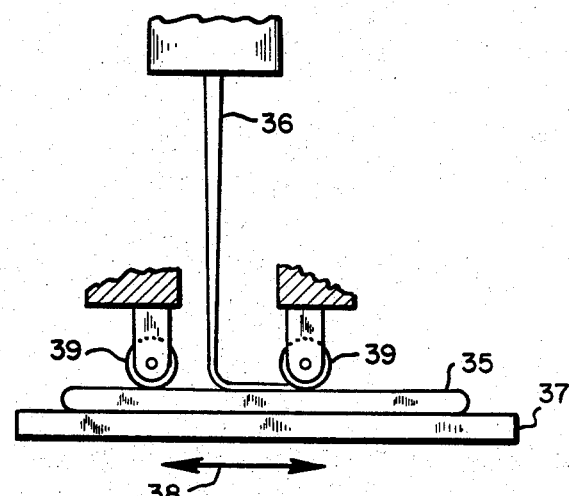
FIGURE 5 is a somewhat schematic view illustrating a further embodiment of the invention.

Referring now to FIGURE 5, a modified form of the present inventive concept is shown applied to the formation of a flat sheet of glass 35 from a stream 36 of high viscosity glass. The stream of glass 36 is delivered along a defined line on the upper surface of an oscillatable mold 37, which oscillates back and forth as indicated by arrow 38 a distance equal to the width of the glass sheet to be formed. As the stream 36 impinges upon the oscillatable mold 37, a pair of smoothing rollers 39 operate along the line of impingement to roll-out the viscous glass so that subsequently applied glass will have a smooth impingement surface which eliminates the formations of blisters and seeds. The sheet glass 35 may be pulled along the mold 37 in a direction normal to the oscillating movement at the rate of formation of the sheet, so that a continuous length thereof may be formed with a desired width, predetermined by the degree of oscillation.

We claim:

1. A method of forming substantially blister-free glass articles from stream-fed molten glass which comprises, feeding a single stream of molten glass to a movable mold surface, continuously moving such mold surface relative to the stream of molten glass and presenting a new impingement area for such stream, mechanically smoothing-out a rim portion of the deposited molten material thereby providing a mechanically smoothed glass surface while continuously feeding a rim-forming stream of molten glass upon the smooth surface, and withdrawing a formed article from the mold.

2. A method of forming glass articles as defined in claim 1 including the steps of moving the mold relative to its cylindrical axis, and continuously impinging the stream of molten glass along a circular line within the mold.

3. A method of forming glass articles as defined in claim 1 including the steps of depositing said stream of molten glass along a line of previously deposited material, mechanically smoothing the molten glass immediately after it is deposited along such line, and supplying additional stream-fed material along the smoothed surface adjacent such line.

4. A method of forming glass cylinders having improved blister-free characteristics from stream-fed molten glass which comprises, stream feeding molten glass downwardly into the loading end of an inclined cylindrical mold, rotating such mold about its longitudinal axis, impinging such stream-fed molten glass along a line contact within the inner periphery of such mold, rolling a bead of the stream-fed material applied along such line into a smooth surface while simultaneously continuing to stream feed additional material upon such smoothed surface to facilitate a blister-free impingement thereof, and withdrawing the formed cylinder from such mold and away from such contact line as it is formed.

5. In the centrifugal forming of glass cylinders from high viscosity stream-fed molten glass wherein high viscosity glass is stream-fed into the upper end of an inclined cylindrical mold rotating about its cylindrical axis and a formed glass cylinder is continuously withdrawn from the opposite end, the improvement comprising the steps of mechanically smoothing out a rim of the high viscosity glass as it is delivered to the mold so as to provide a smooth surface and inhibit the entrapment of air upon the impingement of additional stream-fed molten glass, and while smoothing such rim continuously stream feeding additional molten glass to said smooth surface to continue the formation of said glass cylinder.

6. Apparatus for producing glass cylinders from stream-fed glass which comprises, a cylindrical mold positioned at an inclined angle to the horizontal, means for centrifugally rotating said mold about its longitudinal axis, means for feeding a single stream of molten glass upon a mold surface within an upper loading end of said rotating mold, roller means positioned within said loading end for mechanically smoothing a bead of glass deposited within said mold by said feeding means and providing a smooth glass surface, said feeding means being positioned so as to continuously supply molten glass to the surface smoothed by said roller means, and means for withdrawing a formed cylinder from said mold.

References Cited

UNITED STATES PATENTS

| 1,859,957 | 5/1932 | Canfield | 65—71 |
| 2,662,346 | 12/1953 | Giffen | 65—71 |
| 3,245,770 | 4/1966 | Cortright et al. | 65—71 |
| 2,023,781 | 12/1935 | Cramer | 65—184 XR |
| 2,986,844 | 6/1961 | Lane | 65—184 XR |
| 3,231,356 | 1/1966 | Giffen | 65—184 |
| 3,367,762 | 2/1968 | Teague | 65—184 |

S. LEON BASHORE, Primary Examiner

F. W. MIGA, Assistant Examiner

U.S. Cl. X.R.

65—86, 122, 184, 187, 227, 302